US011112117B2

(12) United States Patent
Patel et al.

(10) Patent No.: US 11,112,117 B2
(45) Date of Patent: Sep. 7, 2021

(54) FUEL NOZZLE COOLING STRUCTURE

(71) Applicant: General Electric Company, Schenectady, NY (US)

(72) Inventors: Nayan Vinodbhai Patel, Liberty Township, OH (US); Ying Huang, West Chester, OH (US); Duane Douglas Thomsen, Lebanon, OH (US)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 63 days.

(21) Appl. No.: 16/037,389

(22) Filed: Jul. 17, 2018

(65) Prior Publication Data

US 2020/0025384 A1 Jan. 23, 2020

(51) Int. Cl.
*F23R 3/28* (2006.01)
*F23R 3/00* (2006.01)
*F02K 3/06* (2006.01)

(52) U.S. Cl.
CPC .............. *F23R 3/283* (2013.01); *F23R 3/002* (2013.01); *F02K 3/06* (2013.01)

(58) Field of Classification Search
CPC ...... F05D 2240/15; F23D 11/12; F23D 11/36; F23D 11/38; F23D 2206/10; F23D 2900/00014; F23R 3/002; F23R 3/04; F23R 3/283; F23R 3/286
See application file for complete search history.

(56) References Cited

U.S. PATENT DOCUMENTS

| 5,941,076 | A | * | 8/1999 | Sandelis | F23R 3/26 60/752 |
|---|---|---|---|---|---|
| 7,467,518 | B1 | | 12/2008 | Vermeersch | |
| 7,596,950 | B2 | | 10/2009 | Woltmann et al. | |
| 8,387,391 | B2 | | 3/2013 | Patel et al. | |
| 8,726,668 | B2 | | 5/2014 | Patel et al. | |
| 8,955,327 | B2 | | 2/2015 | Barker et al. | |
| 9,404,658 | B2 | | 8/2016 | Nickolaus | |

(Continued)

FOREIGN PATENT DOCUMENTS

| CN | 105972643 A | 9/2016 |
|---|---|---|
| CN | 106194434 A | 12/2016 |
| CN | 106969379 A | 7/2017 |

OTHER PUBLICATIONS

Quandaries and Queries, Oct. 2, 2006, University of Regina, accessed Jan. 28, 2021 via wayback machine at https://web.archive.org/web/20061002171749/http://mathcentral.uregina.ca/QQ/database/QQ.09.05/ben1.html (Year: 2006).*

(Continued)

*Primary Examiner* — Scott J Walthour
(74) *Attorney, Agent, or Firm* — Venable LLP; Edward A. Kmett; Michele V. Frank

(57) ABSTRACT

A fuel nozzle for a combustor assembly of a heat engine is generally provided. The fuel nozzle defines a fuel nozzle centerline therethrough and a radial direction extended from the nozzle centerline. The fuel nozzle includes a first wall extended along the radial direction. The first wall defines a first cooling passage and a second cooling passage each extended therethrough. The first cooling passage is defined at a first acute angle relative to the nozzle centerline. The second cooling passage is defined at a second acute angle 90 degrees or less relative to the first acute angle.

20 Claims, 6 Drawing Sheets

(56) References Cited

U.S. PATENT DOCUMENTS

| | | | |
|---|---|---|---|
| 9,752,440 B2 | 9/2017 | Miranda et al. | |
| 10,215,415 B2 | 2/2019 | Stewart | |
| 2008/0289340 A1 | 11/2008 | Oda et al. | |
| 2009/0173076 A1 | 7/2009 | Toon | |
| 2010/0050644 A1* | 3/2010 | Pidcock | F23R 3/343 |
| | | | 60/737 |
| 2010/0269506 A1 | 10/2010 | Nonaka et al. | |
| 2012/0151929 A1* | 6/2012 | Patel | F23R 3/28 |
| | | | 60/740 |
| 2014/0033725 A1 | 2/2014 | Chen et al. | |
| 2015/0292356 A1 | 10/2015 | Yeager et al. | |
| 2015/0292743 A1* | 10/2015 | Mook | F23R 3/14 |
| | | | 60/806 |
| 2016/0265780 A1* | 9/2016 | Patel | F23R 3/283 |
| 2016/0273771 A1 | 9/2016 | Cunha et al. | |
| 2016/0313004 A1 | 10/2016 | Chang et al. | |
| 2016/0313005 A1 | 10/2016 | Chang et al. | |
| 2017/0009986 A1* | 1/2017 | Patel | F02C 3/04 |
| 2017/0284674 A1 | 10/2017 | Perveiler | |
| 2019/0056110 A1* | 2/2019 | Stevens | F23R 3/06 |
| 2019/0063753 A1* | 2/2019 | Stevens | F23R 3/346 |

OTHER PUBLICATIONS

Chinese Search Report and Office Action Corresponding to Application No. 201910646289 dated May 11, 2020.

* cited by examiner

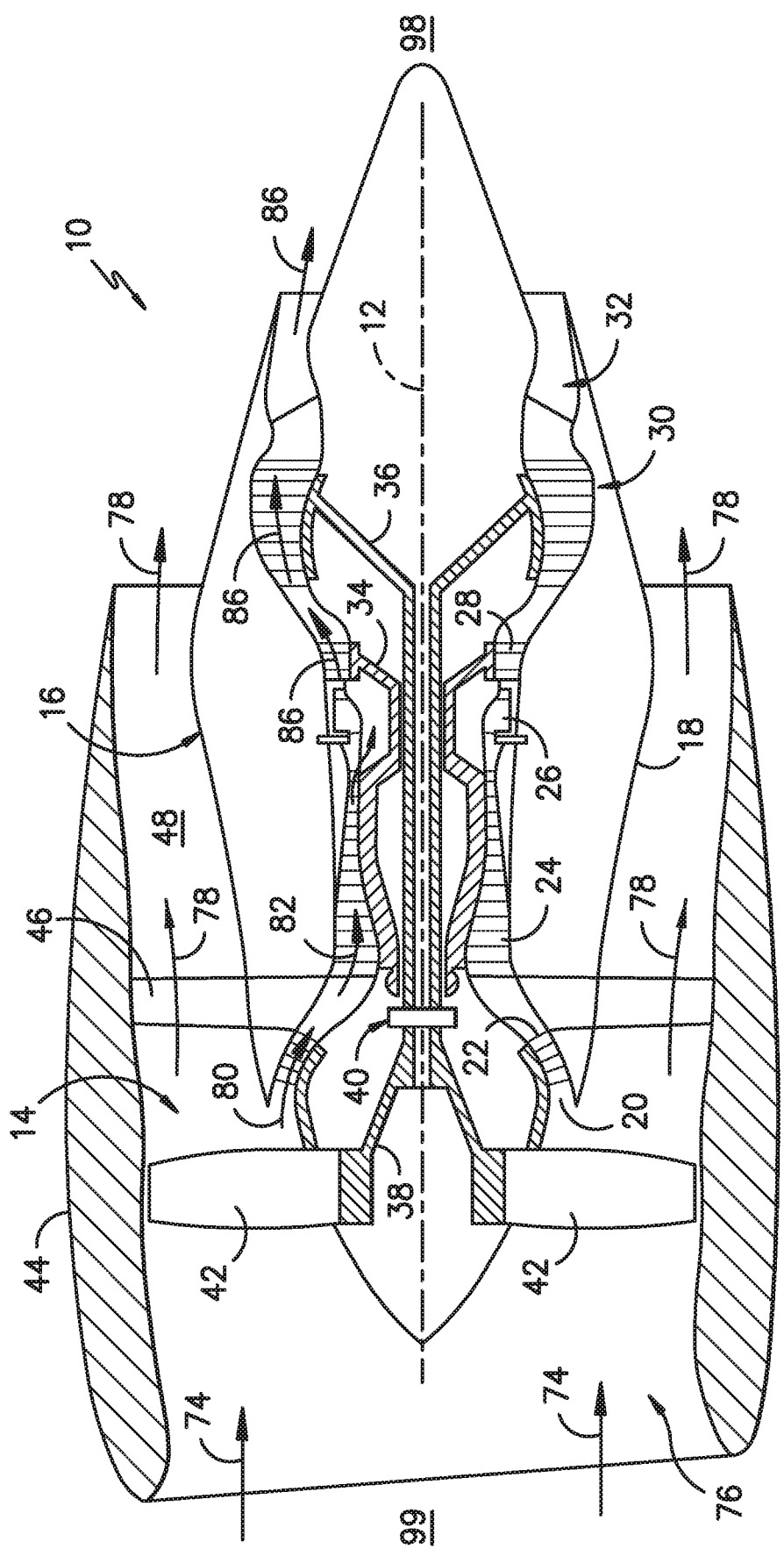
FIG. -1-

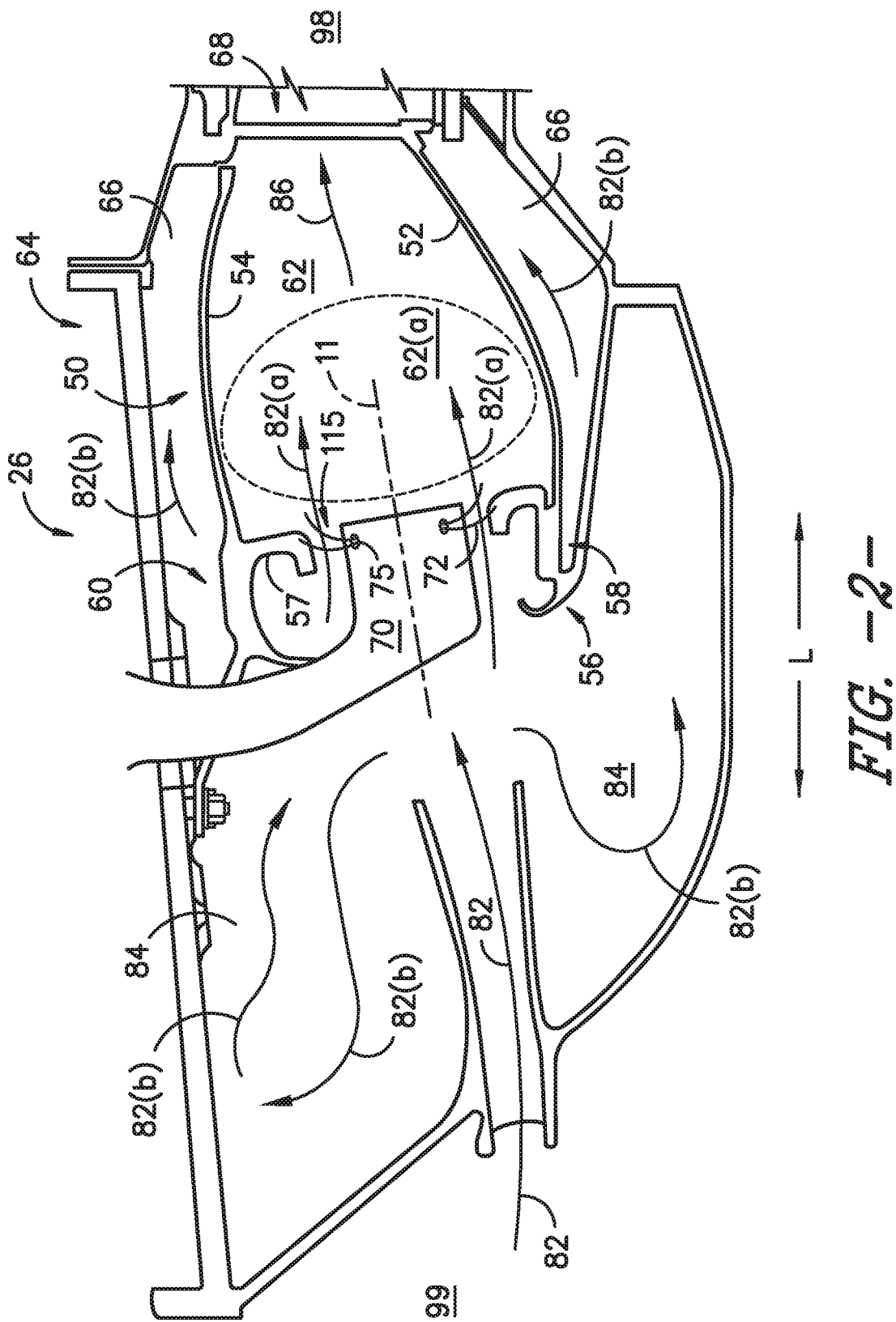
FIG. -2-

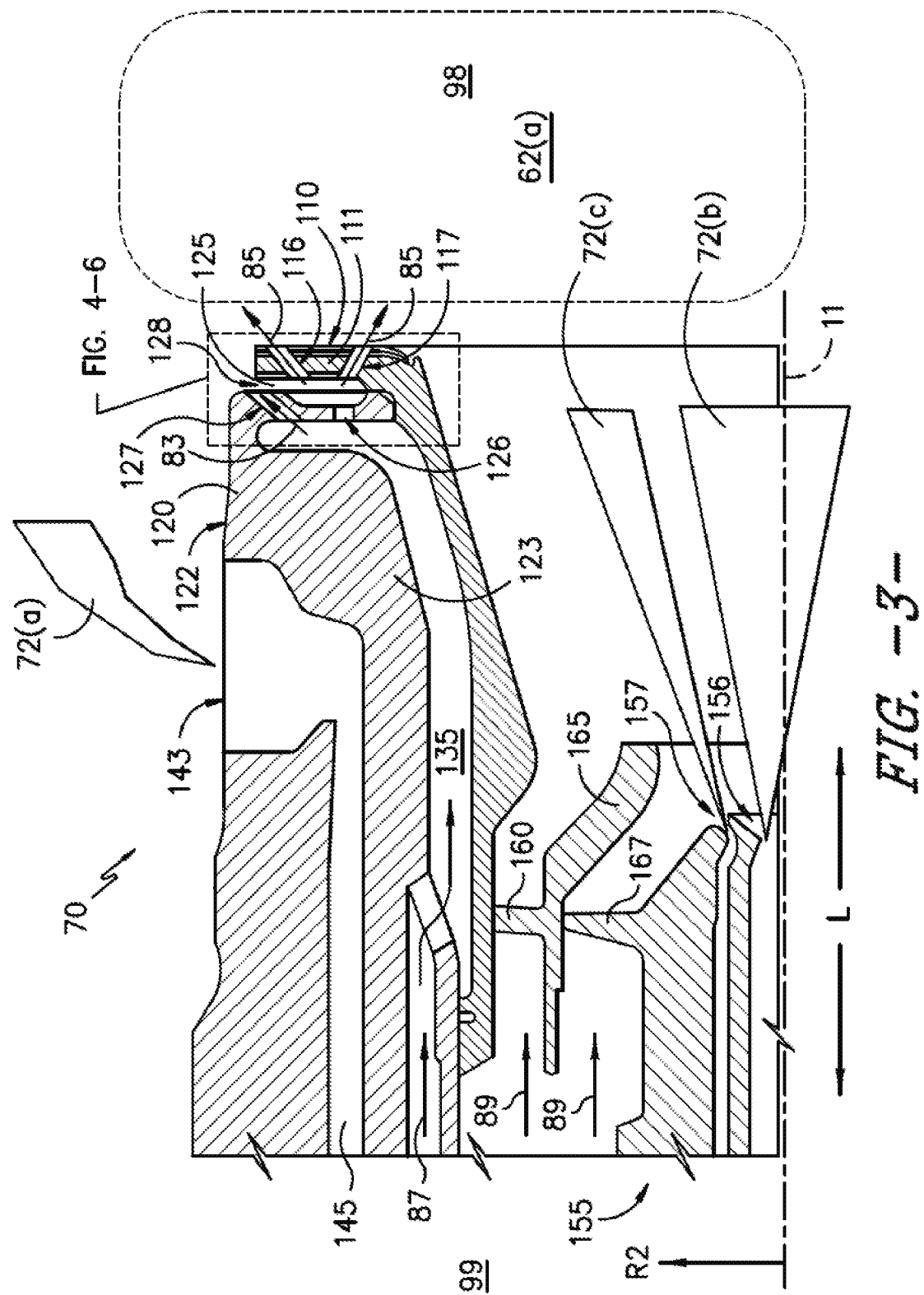

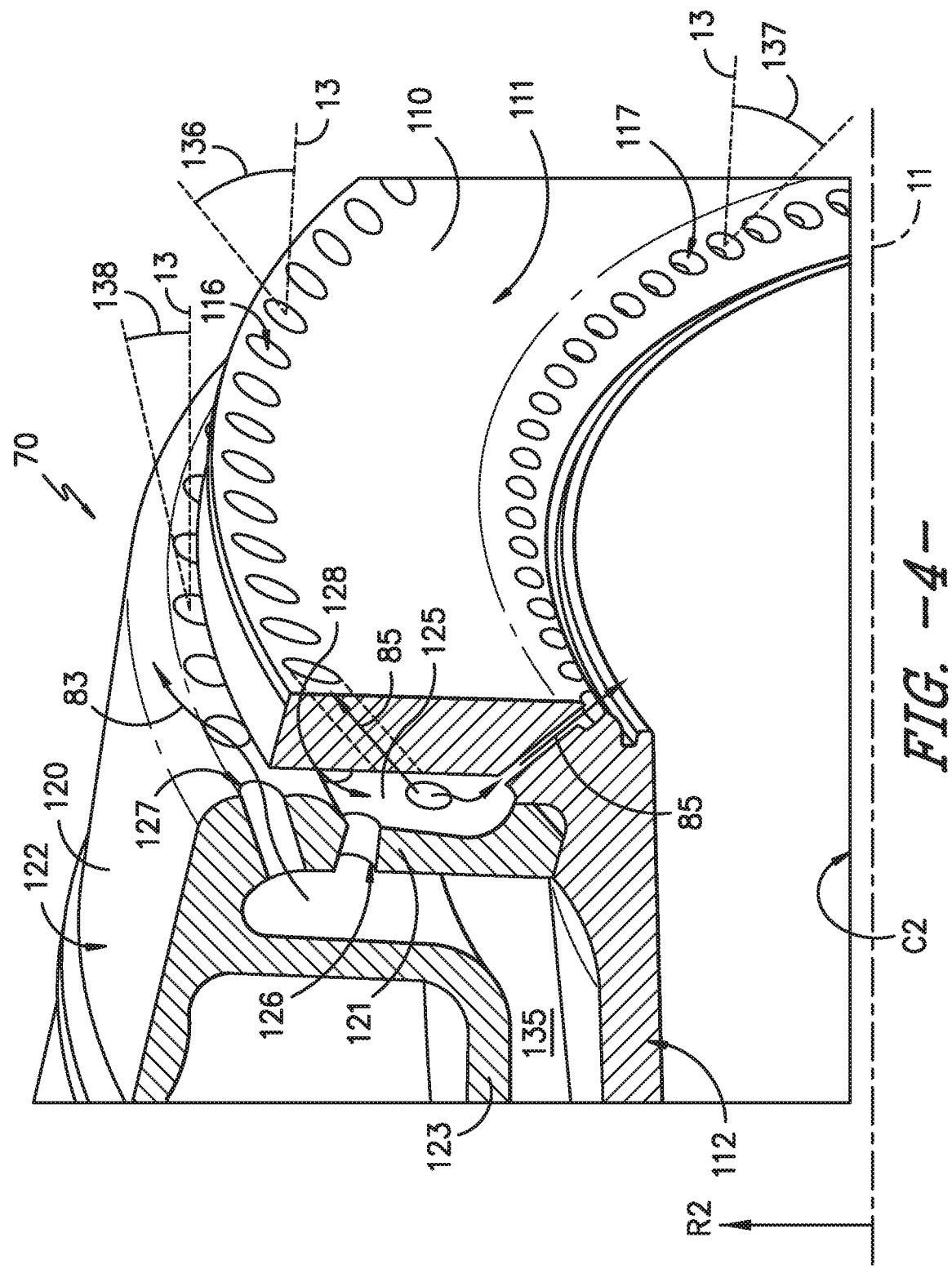
FIG. -4-

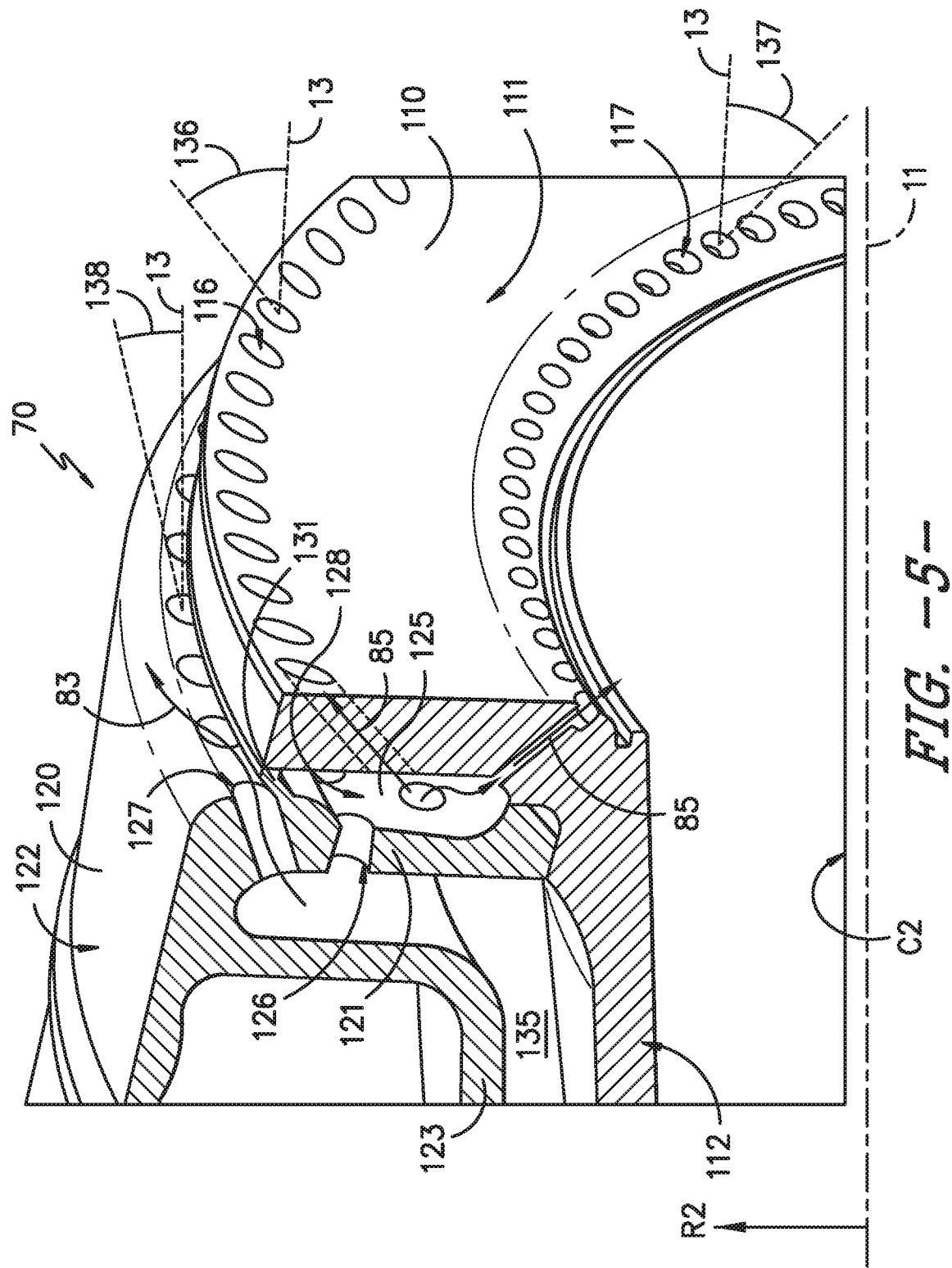
FIG. -5-

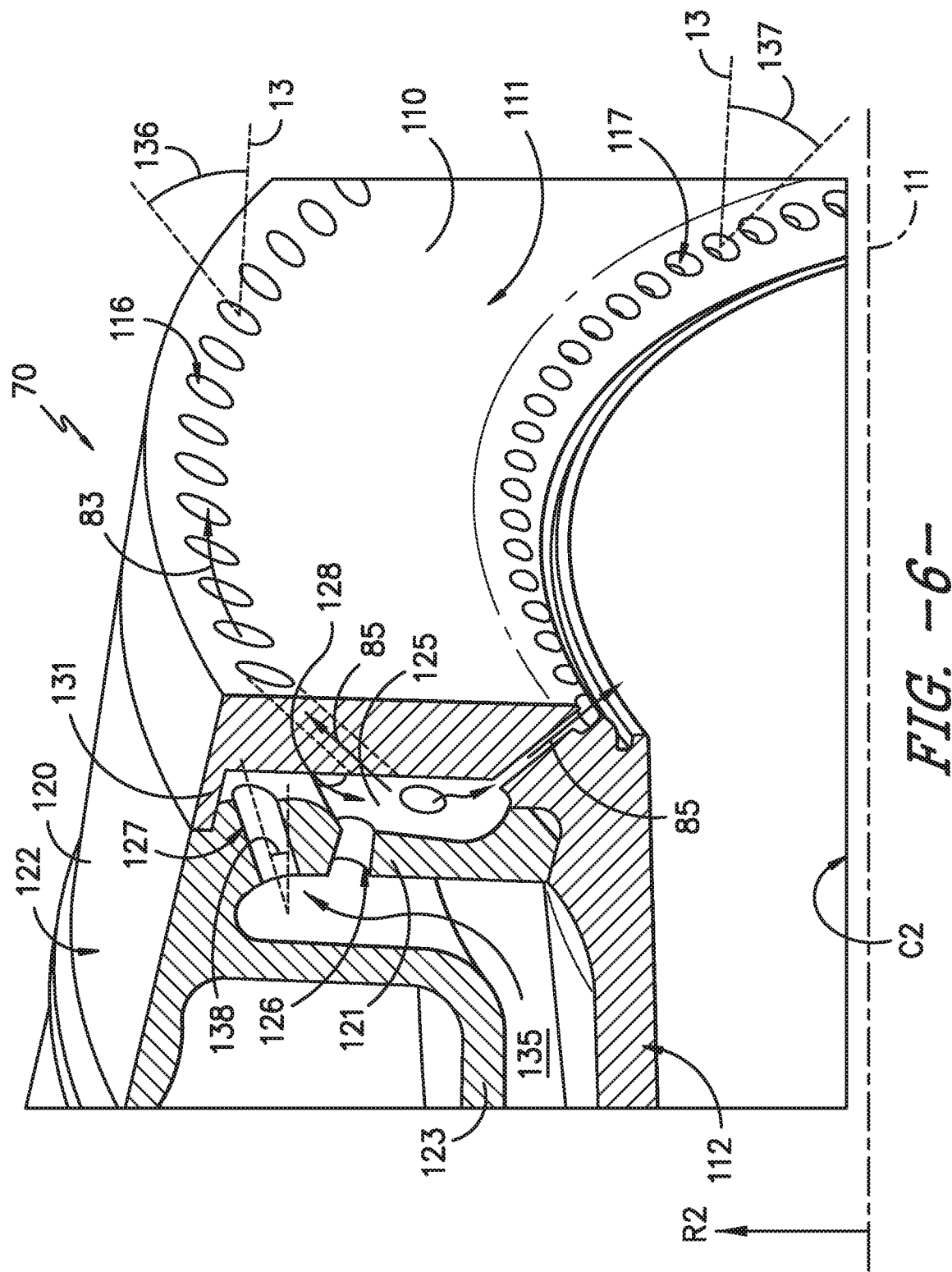
FIG. -6-

FUEL NOZZLE COOLING STRUCTURE

FIELD

The present subject matter relates to cooling structures for fuel nozzles for heat engine combustor assemblies.

BACKGROUND

Combustors and the gas turbine engines into which they are installed are required to meet or exceed increasingly stringent emissions requirements. Combustion emissions are in part a function of a temperature of combustion products and residence time within the combustor before egressing downstream to a turbine section. Combustion emissions may further be a function of an amount of cooling air mixed with the combustion products. For example, combustor assemblies and fuel nozzles for gas turbine engines are exposed to high gas temperatures from combustion products, resulting in deterioration that further requires costly repair or replacement.

However, cooling air used within a gas turbine engine may provide structural durability for components such as fuel nozzles while adversely affecting emissions, such as via affecting residence time or pattern factor or temperature profile of the combustion gases. As such, there is a need for a combustor assembly and fuel nozzle that improves structural durability of fuel nozzles while further improving emissions output.

BRIEF DESCRIPTION

Aspects and advantages of the invention will be set forth in part in the following description, or may be obvious from the description, or may be learned through practice of the invention.

A fuel nozzle for a combustor assembly of a heat engine is generally provided. The fuel nozzle defines a fuel nozzle centerline therethrough and a radial direction extended from the nozzle centerline. The fuel nozzle includes a first wall extended along the radial direction. The first wall defines a first cooling passage and a second cooling passage each extended therethrough. The first cooling passage is defined at a first acute angle relative to the nozzle centerline. The second cooling passage is defined at a second acute angle 90 degrees or less relative to the first acute angle.

In various embodiments, the first cooling passage and the second cooling passage are each extended along a tangential direction relative to the nozzle centerline. In one embodiment, the tangential direction is between 5 degrees and 45 degrees.

In one embodiment, the first wall defines a plurality of first cooling passages in circumferentially adjacent arrangement through the first wall.

In another embodiment, the first wall defines a plurality of second cooling passages in circumferentially adjacent arrangement through the first wall.

In yet another embodiment, the second cooling passage is defined radially inward of the first cooling passage.

In various embodiments, the fuel nozzle further includes a centerbody defined around the nozzle centerline. The centerbody includes a second wall extended substantially parallel to the first wall. The second wall is disposed forward of the first wall. The second wall defines a cooling cavity opening therethrough.

In one embodiment, the centerbody defines a cooling flow passage therewithin. The centerbody further defines a fuel flow passage therewithin. The cooling flow passage is in fluid communication with the cooling cavity opening.

In various embodiments, the first wall defines a conical portion defined around the nozzle centerline and radially inward of the first cooling passage and the second cooling passage. The second wall of the centerbody is coupled to the first wall. The second wall and the first wall together define a cooling cavity therebetween. In one embodiment, the cooling cavity opening is defined in fluid communication with the cooling cavity. In another embodiment, a third wall is coupled to the second wall and the first wall. The first wall, the second wall, and the third wall together enclose the cooling cavity.

In still various embodiments, the combustor assembly defines an axial centerline extended along a longitudinal direction and a radial direction extended from the axial centerline. The combustor assembly includes one or more liners extended along the longitudinal direction. The combustor assembly further includes a deflector wall extended along the radial direction from the axial centerline. The liner and the deflector wall together define a combustion chamber therewithin. A fuel nozzle defining a fuel nozzle centerline is extended through the deflector wall and a nozzle radial direction is extended from the nozzle centerline. The fuel nozzle includes a first wall extended along the nozzle radial direction. The first wall is disposed adjacent to the combustion chamber. The first wall defines a first cooling passage and a second cooling passage each extended therethrough. The first cooling passage is defined at a first acute angle relative to the nozzle centerline. The second cooling passage is defined at a second acute angle 90 degrees or less relative to the first acute angle.

In various embodiments, the first cooling passage and the second cooling passage of the fuel nozzle are each extended along a tangential direction relative to the nozzle centerline. In one embodiment, the tangential direction of the first cooling passage and the second cooling passage is between 5 degrees and 45 degrees.

In one embodiment, the first wall of the fuel nozzle defines a plurality of first cooling passages in circumferentially adjacent arrangement through the first wall. An aft end of the first cooling passage is in fluid communication with the combustion chamber.

In another embodiment, the first wall of the fuel nozzle defines a plurality of second cooling passages in circumferentially adjacent arrangement through the first wall, and wherein an aft end of the second cooling passage is in fluid communication with the combustion chamber.

In various embodiments, the fuel nozzle further includes a centerbody defined around the nozzle centerline. The centerbody includes a second wall extended substantially parallel to the first wall. The second wall is disposed forward of the first wall. The second wall defines a cooling cavity opening therethrough. In one embodiment, the first wall of the fuel nozzle defines a conical portion defined around the nozzle centerline and radially inward of the first cooling passage and the second cooling passage. The second wall of the centerbody is coupled to the first wall. The second wall and the first wall together define a cooling cavity therebetween.

In one embodiment, the fuel nozzle further includes a third wall coupled to the second wall and the first wall. The first wall, the second wall, and the third wall together enclose the cooling cavity.

In another embodiment, the second wall further defines a second wall opening extended therethrough. The second wall opening is in fluid communication with the combustion chamber.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which:

FIG. 1 is a schematic cross sectional view of an exemplary gas turbine engine incorporating an exemplary embodiment of a fuel injector and fuel nozzle assembly;

FIG. 2 is a cross sectional view of an exemplary embodiment of a combustor assembly of the exemplary engine shown in FIG. 1;

FIG. 3 is an exemplary cross sectional view of an embodiment of a fuel nozzle of the combustor assembly of FIG. 2; and FIGS. 4-6 are perspective views of exemplary embodiments of the fuel nozzle depicted in FIG. 3.

Repeat use of reference characters in the present specification and drawings is intended to represent the same or analogous features or elements of the present invention.

DETAILED DESCRIPTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

As used herein, the terms "first", "second", and "third" may be used interchangeably to distinguish one component from another and are not intended to signify location or importance of the individual components.

The terms "upstream" and "downstream" refer to the relative direction with respect to fluid flow in a fluid pathway. For example, "upstream" refers to the direction from which the fluid flows, and "downstream" refers to the direction to which the fluid flows.

Approximations recited herein may include margins based on one more measurement devices as used in the art, such as, but not limited to, a percentage of a full scale measurement range of a measurement device or sensor. Alternatively, approximations recited herein may include margins of 10% of an upper limit value greater than the upper limit value or 10% of a lower limit value less than the lower limit value.

Embodiments of a fuel nozzle and combustor assembly for a heat engine are generally provided herein that improve cooling flow at the fuel nozzle such as to improve structural durability of fuel nozzles. The embodiments generally provided herein provide a flow of air in the near-field hot-side boundary layer on an aft heat-shield surface of the fuel nozzle. The placement of the flow of air is vectored in a compounded angle to maintain double-vortex structure on the hot-side of the aft head shield. The flow of air through the aft heat shield provides bore cooling to improve thermal performance, thereby improving structural durability of the fuel nozzle while mitigating adverse impacts to aero-thermal performance of the combustor assembly.

Referring now to the drawings, FIG. 1 is a schematic partially cross-sectioned side view of an exemplary heat engine 10 herein referred to as "engine 10" as may incorporate various embodiments of the present invention. Although further described herein as a gas turbine engine, the engine 10 may define a turbofan, turboshaft, turboprop, or turbojet gas turbine engine, including marine and industrial engines and auxiliary power units. As shown in FIG. 1, the engine 10 has a longitudinal or axial centerline axis 12 that extends therethrough for reference purposes. In general, the engine 10 may include a fan assembly 14 and a core engine 16 disposed downstream from the fan assembly 14.

The core engine 16 may generally include a substantially tubular outer casing 18 that defines an annular inlet 20. The outer casing 18 encases or at least partially forms, in serial flow relationship, a compressor section having a booster or low pressure (LP) compressor 22, a high pressure (HP) compressor 24, a combustion section 26, a turbine section including a high pressure (HP) turbine 28, a low pressure (LP) turbine 30 and a jet exhaust nozzle section 32. A high pressure (HP) rotor shaft 34 drivingly connects the HP turbine 28 to the HP compressor 24. A low pressure (LP) rotor shaft 36 drivingly connects the LP turbine 30 to the LP compressor 22. The LP rotor shaft 36 may also be connected to a fan shaft 38 of the fan assembly 14. In particular embodiments, as shown in FIG. 1, the LP rotor shaft 36 may be connected to the fan shaft 38 via a reduction gear 40 such as in an indirect-drive or geared-drive configuration.

As shown in FIG. 1, the fan assembly 14 includes a plurality of fan blades 42 that are coupled to and that extend radially outwardly from the fan shaft 38. An annular fan casing or nacelle 44 circumferentially surrounds the fan assembly 14 and/or at least a portion of the core engine 16. It should be appreciated by those of ordinary skill in the art that the nacelle 44 may be configured to be supported relative to the core engine 16 by a plurality of circumferentially-spaced outlet guide vanes or struts 46. Moreover, at least a portion of the nacelle 44 may extend over an outer portion of the core engine 16 so as to define a bypass airflow passage 48 therebetween.

FIG. 2 is a cross sectional side view of an exemplary combustion section 26 of the core engine 16 as shown in FIG. 1. As shown in FIG. 2, the combustion section 26 may generally include an annular type combustor assembly 50 having an annular inner liner 52, an annular outer liner 54, and a bulkhead wall 56 together defining a combustion chamber 62. The combustion chamber 62 may more specifically define a region defining a primary combustion zone 62(a) at which initial chemical reaction of the fuel-oxidizer mixture and/or recirculation of the combustion products may occur before flowing further downstream. The bulkhead wall 56 and the dome assembly 57 each extend radially between upstream ends 58, 60 of the radially spaced inner liner 52 and the outer liner 54, respectively. The dome assembly 57 is disposed downstream of the bulkhead wall 56, adjacent to the generally annular combustion chamber 62 defined between the dome assembly 57, the inner liner 52, and the outer liner 54. More specifically, the dome assembly 57 is defined generally adjacent to the combustion chamber 62, such as defining a generally radial upstream wall. In particular embodiments, the inner liner 52 and/or the outer liner 54 may be at least partially or entirely formed from metal alloys or ceramic matrix composite (CMC) materials.

As shown in FIG. 2, the inner liner 52 and the outer liner 54 may be encased within a diffuser or outer casing 64. An outer flow passage 66 may be defined around the inner liner 52 and/or the outer liner 54. The inner liner 52 and the outer liner 54 may extend from the bulkhead wall 56 towards a turbine nozzle or inlet 68 to the HP turbine 28 (FIG. 1), thus at least partially defining a hot gas path between the combustor assembly 50 and the HP turbine 28.

During operation of the engine 10, as shown in FIGS. 1 and 2 collectively, a volume of air as indicated schematically by arrows 74 enters the engine 10 through an associated inlet 76 of the nacelle 44 and/or fan assembly 14. As the air 74 passes across the fan blades 42 a portion of the air as indicated schematically by arrows 78 is directed or routed into the bypass airflow passage 48 while another portion of the air as indicated schematically by arrow 80 is directed or routed into the LP compressor 22. Air 80 is progressively compressed as it flows through the LP and HP compressors 22, 24 towards the combustion section 26. As shown in FIG. 2, the now compressed air as indicated schematically by arrows 82 flows into a diffuser cavity or head end portion 84 of the combustion section 26.

The compressed air 82 pressurizes the diffuser cavity 84. A first portion of the compressed air 82, as indicated schematically by arrows 82($a$) flows from the diffuser cavity 84 into the combustion chamber 62 where it is mixed with the fuel 72 and burned, thus generating combustion gases, as indicated schematically by arrows 86, within the combustor assembly 50. Portions of the compressed air 82($a$) are further used at the fuel nozzle 70 such as further described below in regard to FIGS. 3-6. Typically, the LP and HP compressors 22, 24 provide more compressed air to the diffuser cavity 84 than is needed for combustion. Therefore, a second portion of the compressed air 82 as indicated schematically by arrows 82($b$) may be used for various purposes other than combustion. For example, as shown in FIG. 2, compressed air 82($b$) may be routed into the outer flow passage 66 to provide cooling to the inner and outer liners 52, 54. In addition or in the alternative, at least a portion of compressed air 82($b$) may be routed out of the diffuser cavity 84. For example, a portion of compressed air 82($b$) may be directed through various flow passages to provide cooling air to at least one of the HP turbine 28 or the LP turbine 30.

Referring back to FIGS. 1 and 2 collectively, the combustion gases 86 generated in the combustion chamber 62 flow from the combustor assembly 50 into the HP turbine 28, thus causing the HP rotor shaft 34 to rotate, thereby supporting operation of the HP compressor 24. As shown in FIG. 1, the combustion gases 86 are then routed through the LP turbine 30, thus causing the LP rotor shaft 36 to rotate, thereby supporting operation of the LP compressor 22 and/or rotation of the fan shaft 38. The combustion gases 86 are then exhausted through the jet exhaust nozzle section 32 of the core engine 16 to provide propulsive thrust.

Referring now to FIG. 3, an exemplary cross sectional view of the fuel nozzle 70 is generally provided. Referring also to FIG. 4, a perspective view of a portion of the fuel nozzle 70 is generally provided. Referring to FIGS. 3-4, the fuel nozzle 70 defines a fuel nozzle centerline 11 extended through the deflector wall 57. A nozzle radial direction R2 is extended from the nozzle centerline 11. The fuel nozzle 70 includes a nozzle assembly 110 defined around the nozzle centerline 11. The nozzle assembly 110 includes a first wall 111 extended along the nozzle radial direction R2. The first wall 111 is disposed adjacent to the combustion chamber 62. The nozzle assembly 110 further includes a conical portion 112 defined around the nozzle centerline 11. The conical portion 112 is coupled to the first wall 111 toward an aft end 98 of the fuel nozzle 70.

The first wall 111 defines a first cooling passage 116 and a second cooling passage 117 each extended through the first wall 111. The first cooling passage 116 is defined at a first acute angle 136 through the first wall 111. The first acute angle 136 is defined relative to the nozzle centerline 11 or a co-linear reference line, such as depicted in regard to line 13. The second cooling passage 117 is defined at a second acute angle 137 through the first wall 111. The second acute angle 137 is defined relative to the nozzle centerline 11 or the co-linear reference line 13, such as depicted in regard to FIG. 4. In various embodiments, the second acute angle 137 of the second cooling passage 117 is disposed 90 degrees or less relative to the first acute angle 136 of the first cooling passage 116 along the nozzle radial direction R2.

In various embodiments, the first cooling passage 116 and the second cooling passage 117 are each extended along a tangential direction relative to the nozzle centerline 11 and a circumferential direction C2 (FIGS. 4-6). In one embodiment, the tangential direction of the first cooling passage 116, the second cooling passage 117, or both, is between 5 degrees and 45 degrees. In another embodiment, the tangential direction of the first cooling passage 116, the second cooling passage 117, or both, is between 10 degrees and 40 degrees. In still another embodiment, the tangential direction of the first cooling passage 116, the second cooling passage 117, or both, is between 20 degrees and 30 degrees.

In one embodiment of the fuel nozzle 70, the first wall 111 of the nozzle assembly 110 defines a plurality of the first cooling passages 116 in adjacent arrangement through the first wall 111 along the circumferential direction C2 relative to the nozzle centerline 11. The aft end 98 of the first cooling passage 116 is in fluid communication with the combustion chamber 62.

In another embodiment of the fuel nozzle 70, the first wall 111 of the nozzle assembly 110 defines a plurality of second cooling passages 117 in adjacent arrangement through the first wall 111 along the circumferential direction C2. The aft end 98 of the second cooling passage 117 is in fluid communication with the combustion chamber 62.

In various embodiments, the first and second cooling passages 116, 117 are in circumferential arrangement around the nozzle centerline 11. The second cooling passage 117 is disposed inward along the radial direction R2 relative to the first cooling passage 116.

In still various embodiments, the first wall 111 is defined substantially flat along the radial direction R2. For example, in one embodiment, the first wall 111 may be defined substantially flat along the radial direction R2 between the first cooling passage 116 and the second cooling passage 117.

Referring to FIG. 3, in conjunction with FIG. 4, the fuel nozzle 70 further includes a centerbody 120 defined around the nozzle centerline 11. The centerbody 120 substantially surrounds the nozzle assembly 110 along the nozzle radial direction R2. The centerbody 120 includes a substantially cylindrical outer wall 122 surrounding the conical portion 112 of the nozzle assembly 110.

The centerbody 120 includes a second wall 121 extended substantially parallel to the first wall 111 of the nozzle assembly 110. The second wall 121 is extended from the outer wall 122. The second wall 121 is disposed forward (i.e., toward the forward end 99) of the first wall 111. For example, the second wall 121 is disposed forward of the first wall 111 relative to the nozzle centerline 11. The second wall 121 defines a cooling cavity opening 126 through the second wall 121.

The conical portion 112 of the nozzle assembly 110 is disposed inward along the nozzle radial direction R2 relative to the first cooling passage 116 and the second cooling passage 117. In one embodiment, the second cooling passage 117 is defined inward along the nozzle radial direction R2 of the first cooling passage 116.

In one embodiment of the fuel nozzle 70, the second wall 121 of the centerbody 120 is coupled to the first wall 111 of the nozzle assembly 110. In another embodiment, the second wall 121 is coupled to the conical portion 112 of the nozzle assembly 110. In various embodiments, the centerbody 120 and the nozzle assembly 110 together define a cooling cavity 125 therebetween. In one embodiment, the second wall 121 of the centerbody 125 and the first wall 111 of the nozzle assembly 110 together define the cooling cavity 125 therebetween.

Referring to FIG. 4, in one embodiment, the first wall 111 and the second wall 121 together define the cooling cavity 125 and a cooling cavity egress 128 between the first wall 111 and the second wall 121 in fluid communication with the combustion chamber 62. The cooling cavity egress 128 may define the cooling cavity 125 as a substantially static pressure cooling cavity.

Referring to FIGS. 5-6, in various embodiments, a third wall 131 is coupled to the second wall 121 and the first wall 111. The first wall 111, the second wall 121, and the third wall 131 together enclose the cooling cavity 125. More specifically, the third wall 131 may substantially enclose the cooling cavity 125 at the cooling cavity egress 128 depicted in FIG. 4 such as to define a substantially total pressure cooling cavity.

Referring to FIGS. 4-6, in various embodiments, the cooling cavity opening 126 is defined in fluid communication with the cooling cavity 125. Referring to FIGS. 3-6, the centerbody 120 of the fuel nozzle 70 defines a cooling flow passage 135 within the centerbody 120. The centerbody 120 may further include one or more internal cylindrical walls 123 surrounding the conical portion 112 of the nozzle assembly 110. The cylindrical wall 123 may couple to the conical portion 112 toward a forward end 99 of the fuel nozzle 70. The cylindrical wall 123 may define one or more openings therethrough enabling a flow of air (e.g., a portion of air 82) therethrough into the cooling flow passage 135 within the centerbody 120.

Referring still to FIG. 3, in various embodiments, the fuel nozzle 70 may further define a second fuel injection assembly 155 disposed substantially co-linear to the nozzle centerline 11 and substantially concentric thereto. The second fuel injection assembly 155 may define a substantially cylindrical body disposed inward of the conical portion 112 of the nozzle assembly 110. Various embodiments of the second fuel injection assembly 115 may include one or more vanes (e.g., outer vane 160 and inner vane 167) therein to orient or direct a flow of air 89 flowing across the vanes 160, 167. The outer and inner vanes 160, 167 may generally be separated by a splitter 165 extended at least partially along the longitudinal direction L inward of the conical portion 112 of the nozzle assembly 110. The second fuel injection assembly 155 may provide a pressure atomized flow of fuel 72(b) substantially co-directional to the nozzle centerline 11 via a second fuel injection opening 156 (e.g., along the longitudinal direction L). The second fuel injection opening 156 is defined substantially concentric relative to the nozzle centerline 11.

The second fuel injection assembly 155 may further define a third fuel injection opening 157 outward along the nozzle radial direction R2 of the second fuel injection opening 156. The second fuel injection opening 157 may generally be disposed along the longitudinal direction L and at least partially along the nozzle radial direction R2. The third fuel injection opening 157 provides a flow of fuel 72(c) along the longitudinal direction L outward along the nozzle radial direction R2 of the flow of fuel 72(b) from the second fuel injection opening 156.

Referring still to FIGS. 3-6, in various embodiments of the fuel nozzle 70, the second wall 121 further defines a second wall opening 127 extended through the second wall 121. In various embodiments, the second wall opening 127 is defined at an acute angle 138 relative to the nozzle centerline 11, or the co-linear reference line 13. In one embodiment, the acute angle 138 of the second wall opening 127 is between 5 degrees and 60 degrees. In another embodiment, the acute angle 138 of the second wall opening 127 is between 15 degrees and 45 degrees.

Referring to FIG. 5, in one embodiment, the second wall opening 127 is in fluid communication with the combustion chamber 62. For example, the third wall 131 is disposed radially inward of the second wall opening 127. As such, the second wall opening 127 is extended through the centerbody 120 and adjacent to the third wall 131 such as to provide a flow of air, shown schematically via arrows 83, to the combustion chamber 62 outside of the cooling cavity 125.

Referring to FIG. 6, in another embodiment, the second wall opening 127 is in fluid communication with the cooling cavity 125. For example, the third wall 131 is disposed radially outward of the second wall opening 127. As such, the second wall opening 127 is extended through the centerbody 120 and adjacent to the third wall 131 such as to provide a flow of air into the cooling cavity 125. The flow of air then egresses through the first and second cooling passages 116, 117.

Referring to FIG. 3, in conjunction with FIGS. 4-6, a portion of the flow of compressed air 82(a) enters the fuel nozzle 70 into the cooling flow passage 135, depicted via arrows 87. The flow of air 87 is directed through the cooling flow passage 135 toward the aft end 98 of the fuel nozzle 70. A portion of the flow of air 87 flows through the second wall opening 127, such as depicted via arrows 83. Another portion of the flow of air 87 flows into the cooling cavity 125. The flow of air egresses from the cooling cavity 125 through the first cooling passage 116 and the second cooling passage 117, such as depicted via arrows 85.

All or part of the combustor assembly 50 and/or fuel nozzle 70 may be part of a single, unitary component and may be manufactured from any number of processes commonly known by one skilled in the art. These manufacturing processes include, but are not limited to, those referred to as "additive manufacturing" or "3D printing". Additionally, any number of casting, machining, welding, brazing, or sintering processes, or any combination thereof may be utilized to construct the combustor assembly 50 and/or the fuel nozzle 70. Furthermore, the combustor assembly 50, or portions thereof, such as the fuel nozzle 70, may constitute one or more individual components that are mechanically joined (e.g. by use of bolts, nuts, rivets, or screws, or welding or brazing processes, or combinations thereof) or are positioned in space to achieve a substantially similar geometric, aerodynamic, or thermodynamic results as if manufactured or assembled as one or more components. Non-limiting examples of suitable materials include high-strength steels, nickel and cobalt-based alloys, titanium and titanium-based alloys, and/or metal or ceramic matrix composites, or combinations thereof.

Embodiments of the fuel nozzle 70 and combustor assembly 50 for the engine 10 generally provided herein may improve structural durability of the fuel nozzle 70 via the embodiments of the first cooling passage 116 and the second cooling passage 117 shown and described herein. The embodiments of the fuel nozzle 70 generally provided herein provide the flow of air 85 in proximate to the hot-side boundary layer (e.g., at the primary combustion zone 62(a)) on the nozzle assembly 110 surface of the fuel nozzle. The placement of the flow of air 85 vectored in a compounded angle 136, 137 may maintain a double-vortex structure on the hot-side (e.g., proximate to the combustion chamber 62 and the primary combustion zone 62(a)) of the first wall 111 defining an aft heat shield of the nozzle assembly 110. The flow of air 85 through the first wall 111 defining the aft heat shield of the fuel nozzle 70 provides bore cooling to improve thermal performance, thereby improving structural durability of the fuel nozzle 70. Exemplary embodiments of the fuel nozzle 70 provided herein may further improve combustion dynamics and acoustics, mitigate lean blow out, or mitigate adverse impacts to aero-thermal performance at the combustor assembly 50.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A fuel nozzle for a heat engine, the fuel nozzle defining a fuel nozzle centerline therethrough and a radial direction extended from the fuel nozzle centerline, the fuel nozzle comprising:
    a first wall extended along the radial direction, the first wall defining a first cooling passage and a second cooling passage, each of the first cooling passage and the second cooling passage extending through the first wall such that a first outlet opening of the first cooling passage and a second outlet opening of the second cooling passage are each defined at an aft surface of the first wall, the first wall defining an aft heat shield of the fuel nozzle;
    a second wall extended along the radial direction, the second wall being forward of the first wall and coupled to the first wall via a conical portion of the fuel nozzle at radially inward ends of the first wall and the second wall, respectively; and
    a cooling cavity defined between the first wall, the second wall, and the conical portion of the fuel nozzle, and having a gap formed between the first wall and the second wall extending radially outward from the conical portion of the fuel nozzle,
    wherein the first cooling passage extends in a first direction that forms a first acute angle relative to the fuel nozzle centerline,
    wherein the second cooling passage extends in a second direction that forms a second acute angle relative to the fuel nozzle centerline that is different from the first angle,
    wherein the first and second directions form an angle of 90 degrees or less therebetween,
    wherein a plane perpendicular to the nozzle centerline is defined by the aft surface of the first wall, and
    wherein the first outlet opening and the second outlet opening are positioned in the plane.

2. The fuel nozzle of claim 1, wherein the first cooling passage and the second cooling passage are each extended along a tangential direction relative to the fuel nozzle centerline.

3. The fuel nozzle of claim 2, wherein the tangential direction is between 5 degrees and 45 degrees.

4. The fuel nozzle of claim 1, wherein the first wall defines a plurality of first cooling passages in circumferentially adjacent arrangement through the first wall.

5. The fuel nozzle of claim 1, wherein the first wall defines a plurality of second cooling passages in circumferentially adjacent arrangement through the first wall.

6. The fuel nozzle of claim 1, wherein the second cooling passage is defined radially inward of the first cooling passage.

7. The fuel nozzle of claim 1, further comprising:
    a centerbody defined around the fuel nozzle centerline,
    wherein the centerbody comprises the second wall extended substantially parallel to the first wall, and
    wherein the second wall defines a cooling cavity opening therethrough that opens into the cooling cavity.

8. The fuel nozzle of claim 7,
    wherein the centerbody defines a cooling flow passage therewithin,
    wherein the centerbody further defines a fuel flow passage therewithin, and
    wherein the cooling flow passage is in fluid communication with the cooling cavity opening of the second wall.

9. The fuel nozzle of claim 7, wherein the conical portion is defined around the fuel nozzle centerline and radially inward of the first cooling passage and the second cooling passage.

10. The fuel nozzle of claim 9, wherein the cooling cavity opening of the second wall is defined in fluid communication with the cooling cavity.

11. The fuel nozzle of claim 1, wherein the angle formed between the first and second directions is greater than 45 degrees.

12. A combustor assembly for a heat engine, the combustor assembly defining an axial centerline extended along a longitudinal direction and a radial direction extended from the axial centerline, the combustor assembly comprising:
    one or more liners extended along the longitudinal direction;
    a deflector wall extended along the radial direction from the axial centerline, wherein the one or more liners and the deflector wall together define a combustion chamber therewithin; and
    a fuel nozzle defining a fuel nozzle centerline extended through the deflector wall and a nozzle radial direction extended from the fuel nozzle centerline, wherein the fuel nozzle comprises:
  a first wall extended along the nozzle radial direction, wherein the first wall defines a first cooling passage and a second cooling passage, each of the first cooling passage and the second cooling passage extending through the first wall such that a first outlet opening of the first cooling passage and a second outlet opening of the second cooling passage are each defined at an aft surface of the first wall, the first wall defining an aft heat shield of the fuel nozzle;
  a second wall extended along the nozzle radial direction, the second wall being forward of the first wall and coupled to the first wall via a conical portion of the fuel nozzle at radially inward ends of the first wall and the second wall, respectively; and
  a cooling cavity defined between the first wall, the second wall, and the conical portion of the fuel nozzle, and having a gap formed between the first wall and the second wall extending radially outward from the conical portion of the fuel nozzle,
  wherein the first cooling passage extends in a first direction that forms a first acute angle relative to the fuel nozzle centerline,
  wherein the second cooling passage extends in a second direction that forms a second acute angle relative to the fuel nozzle centerline that is different from the first acute angle,
  wherein the first and second directions form an angle of 90 degrees or less therebetween,
  wherein a plane perpendicular to the nozzle centerline is defined by the aft surface of the first wall, and
  wherein the first outlet opening and the second outlet opening are positioned in the plane.

13. The combustor assembly of claim 12, wherein the first cooling passage and the second cooling passage of the fuel nozzle are each extended along a tangential direction relative to the fuel nozzle centerline.

14. The combustor assembly of claim 13, wherein the tangential direction of the first cooling passage and the second cooling passage is between 5 degrees and 45 degrees.

15. The combustor assembly of claim 12,
  wherein the first wall of the fuel nozzle defines a plurality of first cooling passages in circumferentially adjacent arrangement through the first wall, and
  wherein an aft end of the first cooling passage is in fluid communication with the combustion chamber.

16. The combustor assembly of claim 12,
  wherein the first wall of the fuel nozzle defines a plurality of second cooling passages in circumferentially adjacent arrangement through the first wall, and
  wherein an aft end of the second cooling passage is in fluid communication with the combustion chamber.

17. The combustor assembly of claim 12, further comprising:
  a centerbody defined around the fuel nozzle centerline,
  wherein the centerbody comprises the second wall extended substantially parallel to the first wall,
  wherein the second wall defines a cooling cavity opening therethrough that opens into the cooling cavity.

18. The combustor assembly of claim 17,
  wherein the conical portion is defined around the fuel nozzle centerline and radially inward of the first cooling passage and the second cooling passage.

19. The combustor assembly of claim 18, wherein the second wall further defines a second wall opening extended therethrough, wherein the second wall opening is in fluid communication with the cooling cavity.

20. The combustor assembly of claim 12, wherein the angle formed between the first and second directions is greater than 45 degrees.

* * * * *